United States Patent
Park et al.

(10) Patent No.: US 9,026,113 B2
(45) Date of Patent: May 5, 2015

(54) METHODS AND SYSTEMS FOR HANDOVER USING INCREASED PROBABILITY FOR FAST RANGING SUCCESS

(75) Inventors: Jong Ro Park, San Ramon, CA (US); Chun Woo Lee, San Ramon, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 960 days.

(21) Appl. No.: 12/260,387

(22) Filed: Oct. 29, 2008

(65) Prior Publication Data

US 2010/0103903 A1    Apr. 29, 2010

(51) Int. Cl.
  *H04Q 7/20*   (2006.01)
  *H04W 56/00*  (2009.01)
  *H04B 17/00*  (2006.01)
  *H04W 36/00*  (2009.01)
  *H04W 36/08*  (2009.01)

(52) U.S. Cl.
  CPC ....... *H04W 56/0015* (2013.01); *H04B 17/0047* (2013.01); *H04B 17/0077* (2013.01); *H04W 36/0033* (2013.01); *H04W 36/08* (2013.01); *H04W 56/0045* (2013.01); *H04W 56/0065* (2013.01)

(58) Field of Classification Search
  USPC ................................. 455/436, 439
  See application file for complete search history.

(56) References Cited

U.S. PATENT DOCUMENTS

2004/0174845 A1*  9/2004  Koo et al. ............ 370/328
2005/0101328 A1   5/2005  Son et al.
2005/0192011 A1*  9/2005  Hong et al. .......... 455/440
2005/0288020 A1  12/2005  Cho et al.
2006/0280226 A1* 12/2006  Krasner ............... 375/130
2007/0281720 A1  12/2007  Lee
2008/0227454 A1   9/2008  Damnjanovic

FOREIGN PATENT DOCUMENTS

| | | |
|---|---|---|
| CN | 1585291 A | 2/2005 |
| CN | 1918824 A | 2/2007 |
| EP | 1565024 A2 | 8/2005 |
| JP | 2003518851 A | 6/2003 |
| JP | 2007522759 A | 8/2007 |
| TW | 200837379 A | 9/2008 |
| WO | WO-0120818 A1 | 3/2001 |
| WO | 0147298 A2 | 6/2001 |

(Continued)

OTHER PUBLICATIONS

International Preliminary Report on Patentability—PCT/US2009/060916, The International Bureau of WIPO—Geneva, Switzerland, Feb. 8, 2011.

(Continued)

*Primary Examiner* — Charles Appiah
*Assistant Examiner* — Randy Peaches
(74) *Attorney, Agent, or Firm* — Tyler J. Overall (57) ABSTRACT

Techniques presented herein disclose handover using increased probability of the fast ranging success. Propagation delay of the RF signal transmitted from an MS to a target BS may be estimated based on a known propagation delay to a current serving BS and a relative difference in propagation delays to the current serving BS and the target BS, for example, as indicated by different receive times of preamble sequences transmitted from the current serving BS and the target BS.

28 Claims, 8 Drawing Sheets

(56) References Cited

FOREIGN PATENT DOCUMENTS

WO    2005078966 A1    8/2005
WO    2008115897 A3    1/2009

OTHER PUBLICATIONS

International Search Report—PCT/US2009/060916—International Search Authority, European Patent Office, Jan. 20, 2010.
Bellec M., et al., "A PHY/MAC Proposal for IEEE 802.22 WRAN Systems Part 2: The MAC," IEEE 802.22-06/0003r1, IEEE mentor, Jan. 18, 2006.
Co-pending U.S. Appl. No. 09/397,430, filed Sep. 17, 1999.
IEEE Std 802.16-2001; "Part 16: Air Interface for Fixed Broadband Wireless Access Systems," IEEE Computer Society and the IEEE Microwave Theory and Techniques Society, Published by the Institute of Electrical and Electronics Engineers, Inc., Apr. 8, 2002.
Liang Y.C., et al., "Adaptive Downlink to Uplink Transition Gaps for IEEE 802.22 Systems Employing TDD and OFDMA," IEEE 802.22-06/0104r, IEEE mentor, Jul. 14, 2006.
Taiwan Search Report—TW098136749—TIPO—Oct. 23, 2012.
Written Opinion—PCT/US2009/060916—ISA/EPO—Jan. 20, 2010.
IEEE P802.16/2004/Cor1/D5: "Corrigendum to IEEE Standard for Local and Metropolitan Area Networks—Part 16: Air Interface for Fixed Broadband Wireless Access Systems," Draft IEEE Standard for local and metropolitan area network, Sep. 12, 2005, 288 pages.
IEEE P802.16e/D12: "Part 16: Air Interface for Fixed and mobile Broadband Wireless Access Systems. Amendment for Physical and Medium Access Control Layers for Combined Fixed and Mobile Operation in Licensed Bands," Draft IEEE Standard for Local and metropolitan area networks, Oct. 14, 2005, 684 pages.
IEEE P802.16Rev2/D0b: "Part 16: Air Interface for Broadband Wireless Access Systems", Draft Standard for Local and metropolitan area networks, Jun. 27, 2007, 1754 pages.
IEEE P802.16-REVd/D5: "Part 16: Air Interface for Fixed Broadband Wireless Access Systems," Draft IEEE Standard for Local and metropolitan area networks, May 13, 2004, 915 pages.

* cited by examiner

FIG. 8

US 9,026,113 B2

METHODS AND SYSTEMS FOR HANDOVER USING INCREASED PROBABILITY FOR FAST RANGING SUCCESS

TECHNICAL FIELD

Certain embodiments of the present disclosure generally relate to a wireless communication and, more particularly, to a method for improving handover performance by reliably estimating the RF signal propagation delay between mobile station and base station during a primary synchronization process.

SUMMARY

Certain embodiments provide a method for ranging with a target base station (BS) by a mobile station (MS). The method generally includes calculating a relative time difference in radio frequency (RF) signal propagation delays to a current serving BS and to the target BS, estimating a RF signal propagation delay to the target BS based on the calculated relative time difference and a known propagation delay to the current serving BS, and adjusting a starting time of a ranging request message (RNG-REQ) transmitted to the target BS, based on the estimated RF signal propagation delay to the target BS.

Certain embodiments provide an apparatus for ranging with a target base station (BS) by a mobile station (MS). The apparatus generally includes logic for calculating a relative time difference in radio frequency (RF) signal propagation delays to a current serving BS and to the target BS, logic for estimating a RF signal propagation delay to the target BS based on the calculated relative time difference and a known propagation delay to the current serving BS, and logic for adjusting a starting time of a ranging request message (RNG-REQ) transmitted to the target BS, based on the estimated RF signal propagation delay to the target BS.

Certain embodiments provide an apparatus for ranging with a target base station (BS) by a mobile station (MS). The apparatus generally includes means for calculating a relative time difference in radio frequency (RF) signal propagation delays to a current serving BS and to the target BS, means for estimating a RF signal propagation delay to the target BS based on the calculated relative time difference and a known propagation delay to the current serving BS, and means for adjusting a starting time of a ranging request message (RNG-REQ) transmitted to the target BS, based on the estimated RF signal propagation delay to the target BS.

Certain embodiments provide a computer-program product for ranging with a target base station (BS) by a mobile station (MS), comprising a computer readable medium having instructions stored thereon, the instructions being executable by one or more processors. The instructions generally include instructions for calculating a relative time difference in radio frequency (RF) signal propagation delays to a current serving BS and to the target BS, instructions for estimating a RF signal propagation delay to the target BS based on the calculated relative time difference and a known propagation delay to the current serving BS, and instructions for adjusting a starting time of a ranging request message (RNG-REQ) transmitted to the target BS, based on the estimated RF signal propagation delay to the target BS.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Worldwide Interoperability for Microwave Access (WiMAX) standard mandates hard handover procedure, which is also specified by the IEEE 802.16 standard. According to the IEEE 802.16 standard, target base station (BS) may send Fast Ranging Information Element (IE) in order to allocate dedicated time-frequency resources for a mobile station (MS) that is entering to the range of target BS. After that, an MS may send the Ranging Request (RNG-REQ) message to a target BS without contention through the allocated data burst resources.

Due to uncertain propagation delay of the RF signal transmitted from the MS to the target BS, the MS may not know when to start sending the RNG-REQ message to ensure it arrives at the scheduled uplink OFDM/OFDMA symbol boundary. As a result, the RNG-REQ may arrive at the BS outside a given tolerance around the scheduled OFDM/OFDMA symbol boundary, making it difficult for the BS to accurately decode the RNG-REQ message.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
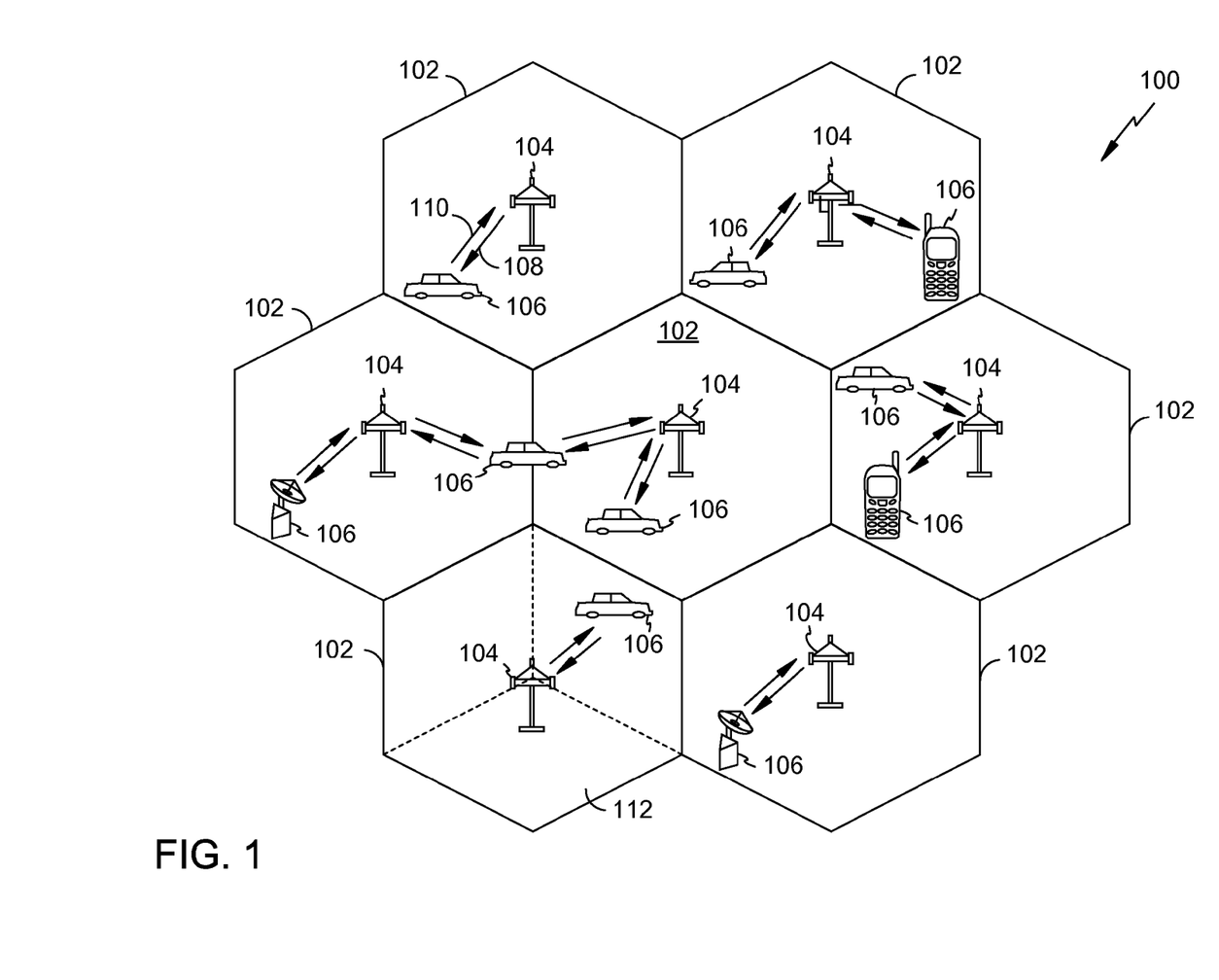
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
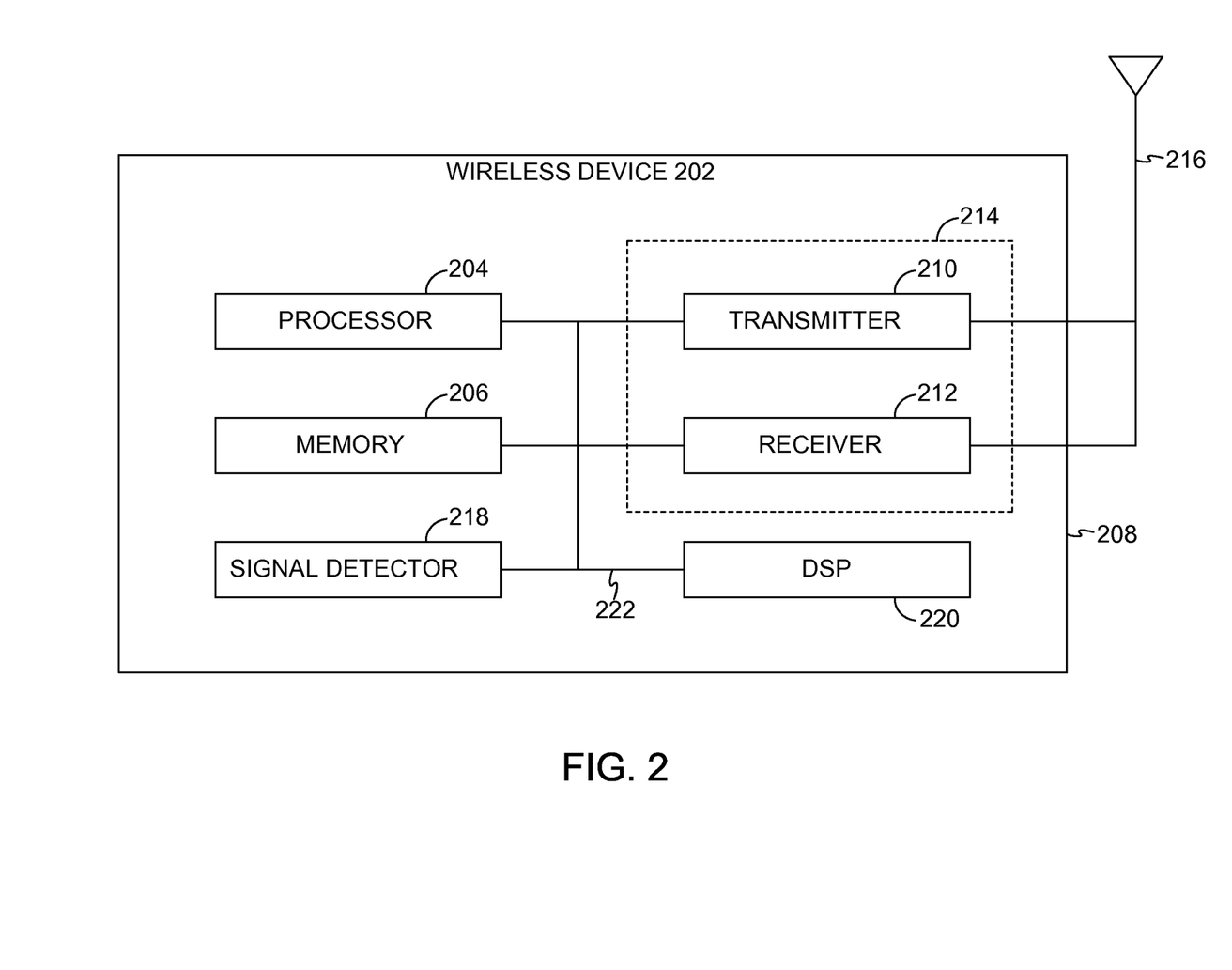
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
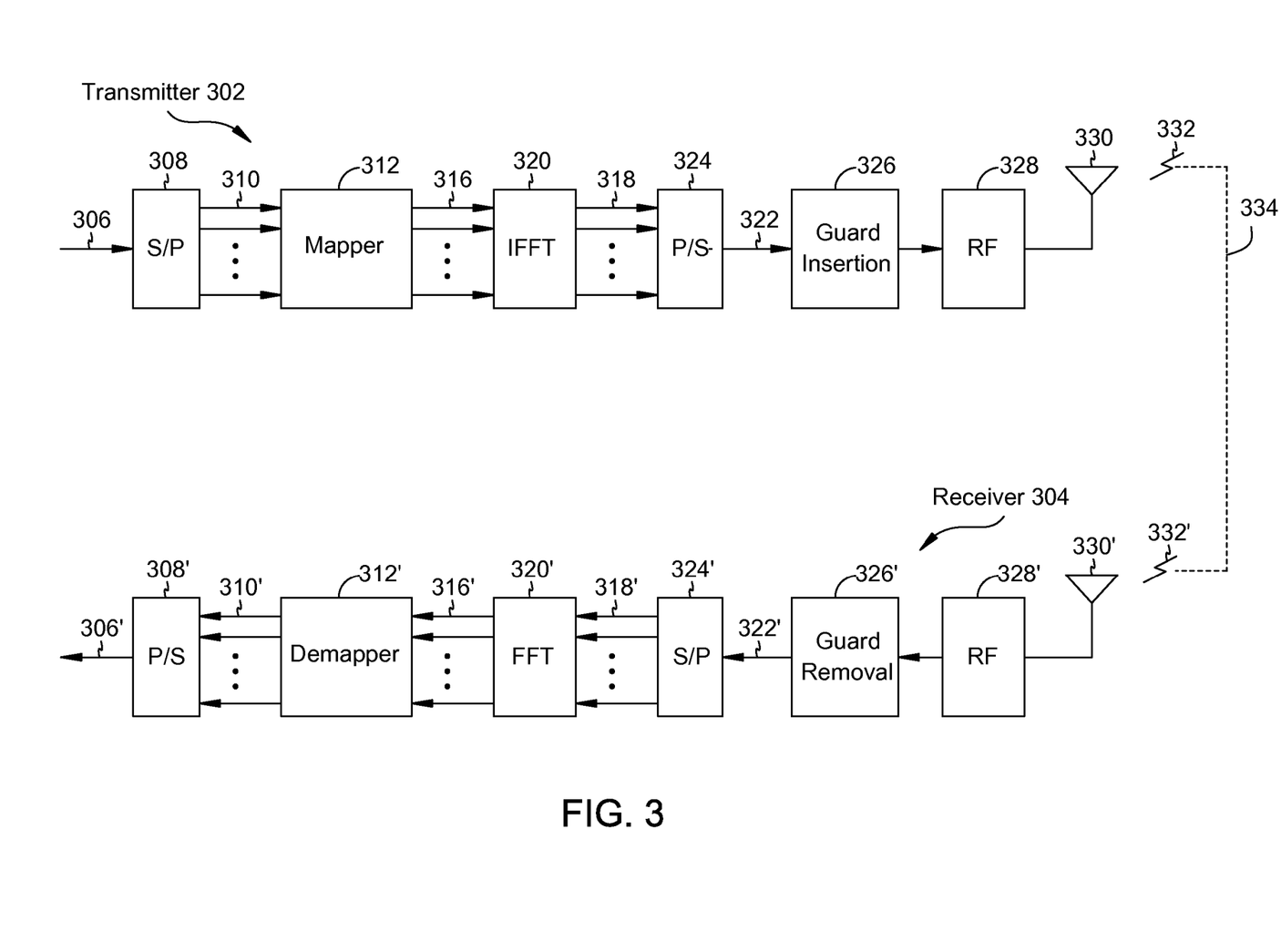
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Ranging Operations During Handover

Certain versions of the WiMAX standard provide a way to estimate the RF signal propagation delay between MS and target BS during the handover procedure by utilizing an association scanning algorithm. However, supporting the association scanning algorithm is not mandatory. On the other hand, the alternative fast ranging procedure is specified as mandatory by the WiMAX standard. Moreover, the fast ranging algorithm may be computationally simpler than the association scanning. If the RF signal propagation delay is accurately estimated with the fast ranging procedure, then a probability of successful delivery and decoding of the RNG-REQ message that is transmitted from an MS to a target BS during the handover process may be substantially increased.

Figure 4:
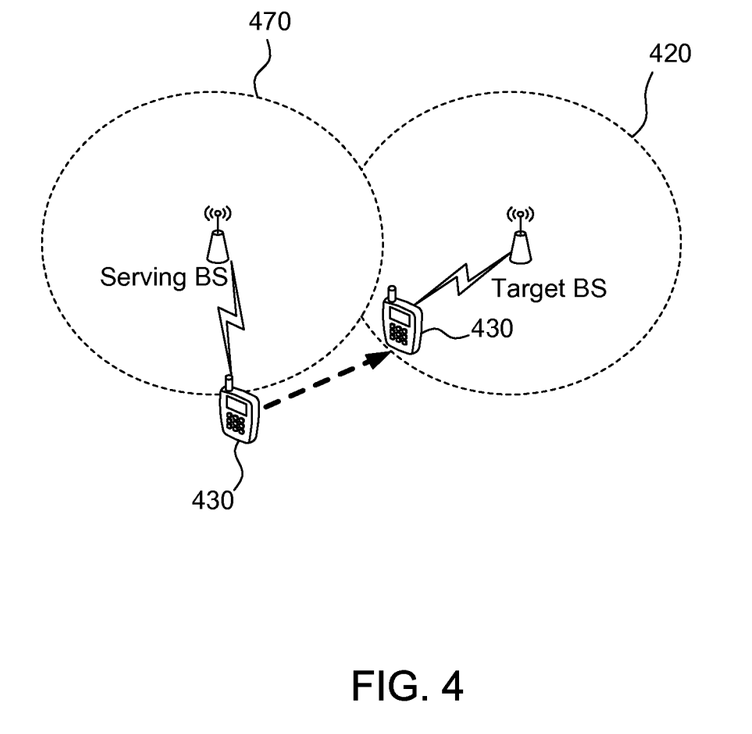
FIG. 4 illustrates movement of a mobile station from a serving base station area to a target base station area in accordance with certain embodiments of the present disclosure.

FIG. 4 illustrates the handover (HO) process as a mobile station (MS) 430 moves from a serving base station (BS) area 410 to a target BS area 420. The HO process is required in order to preserve the communication link between mobile station, serving base station and target base station (newly serving base station). In order to achieve a successful handover, the RF signal propagation delay between MS and target BS may need to be accurately estimated during the initial ranging process performed as a part of the handover process. In order to achieve successful reception and decoding of the ranging request message (RNG-REQ message) during the handover procedure, the RNG-REQ message may need to be delivered at a target BS within a given tolerance of alignment with the scheduled OFDM/OFDMA symbol boundary. For certain embodiments of the present disclosure, a wireless system specified by the WiMAX standard may be adapted to utilize the techniques presented herein.

Figure 5:
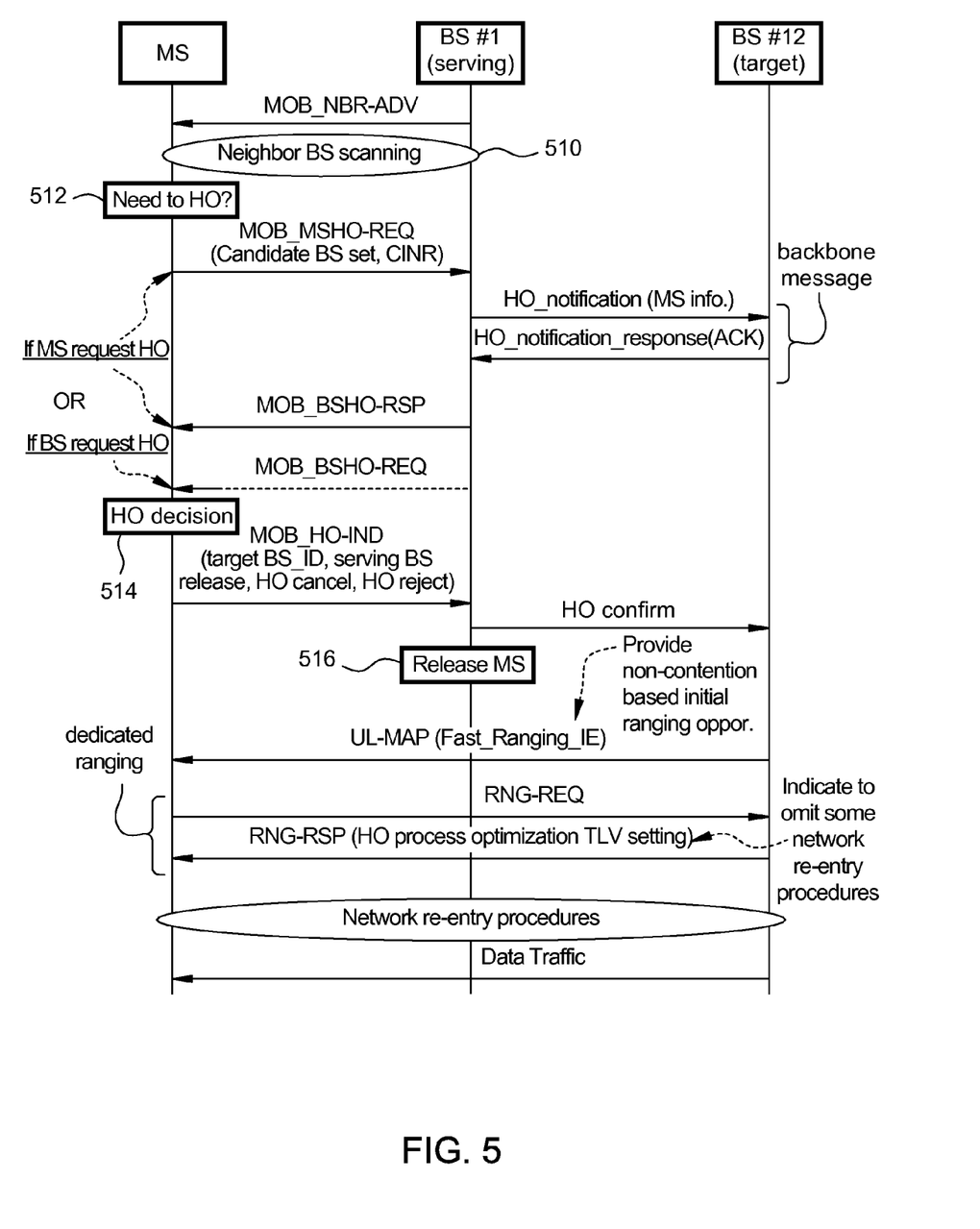
FIG. 5 illustrates the handover procedure in accordance with certain embodiments of the present disclosure.

FIG. 5 illustrates example message exchange 500 for a handover (HO) procedure based on fast ranging. A serving base station (BS1 in FIG. 5) may periodically broadcast the network topology information using the Mobile Neighbor Advertisement (MOB_NBR-ADV) message, which includes information of neighboring BSs. Through neighbor BS scanning 510, an MS may select a specific candidate BS for the HO process. If the HO process becomes required (as determined at 512), the MS may send a Mobile MS Handover Request (MOB_MSHO-REQ) message to a currently serving BS in order to request the handover from the serving BS to a target BS (BS2 in FIG. 5). The MOB_MSHO-REQ message may specify a set of candidate target BSs, as well as information about Carrier to Interference-plus-Noise Ratio (CINR), Received Signal Strength Indication (RSSI) and Round Trip Delay (RTD) at the MS side of the communication link.

Based on the MOB_MSHO-REQ message, the serving BS may notify the selected target BS about the HO process by sending the HO-notification message that contains specific information related to an MS. After that, the target BS may send an HO-notification-response massage to the currently serving BS in order to acknowledge support for the HO process. Then, the serving BS may send an HO-confirmation message to the target BS.

Following the HO request confirmation, the serving BS may send a Mobile BS Handover Response (MOB_BSHO-RSP) message to the MS with specific information related to the target BS. Note that the target BS may also initiate the HO with a MOB_BSHO-REQ message. The final decision about the HO may be confirmed in either case, at 514. Following the final decision, the MS may send a Mobile Handover Indication (MOB_HO-IND) message to the currently serving BS. The MOB_HO-IND message may contain the identification (ID) of the target BS and may request to release the currently serving BS. Once the Resource Retain time period has been elapsed, the serving BS may release the MS, at 516.

Once the MS has been released from the serving BS, the target BS (or newly serving BS) may send the UL-MAP message to the MS with the Fast Ranging Information Element (IE) in order to provide the non-contention based initial ranging resources to an MS. Following the UL-MAP message, the MS may send the Ranging Request (RNG-REQ) message to the target BS. The timing of the RNG-REQ message may contain information about the RF signal propagation delay between the MS and the target BS. Certain embodiments of the present disclosure allow the starting time of sending the RNG-REQ message to be adjusted based on an estimated propagation delay between the MS and the target BS.

As a response to the RNG-REQ message, a target BS may send the Ranging Response (RNG-RSP) message to an MS, informing the MS about parameters that may need to be adjusted during primary synchronization. Required adjustments are based on estimated RF signal propagation delay. Finally, a target BS may become a serving BS, and data traffic between the serving BS and the MS may be reliably established.

The ranging process, as a part of the HO procedure, may be defined as a process of acquiring correct timing offset, carrier frequency offset and power allocation at an MS based on the RF signal propagation delay to a target BS. As a part of the ranging process, the MS may achieve three important goals. First, the MS may become time-aligned with the target BS, which is required for successful uplink transmission. Second, the MS may adjust transmission frequency in order to be better synchronized with receive frequency of the target BS (or newly serving BS). Third, the transmission power at the MS may be adjusted to account for the distance and requirement to the target BS.

Once the initial ranging process is successfully performed, transmissions from the MS may be aligned with uplink sub-frames of the BS within an allowable reception tolerance. Furthermore, as illustrated in FIG. 6, mobile stations at different distances from a serving BS may need different timing offset and power allocation for the uplink transmission because of different propagation delays.

Figure 6:
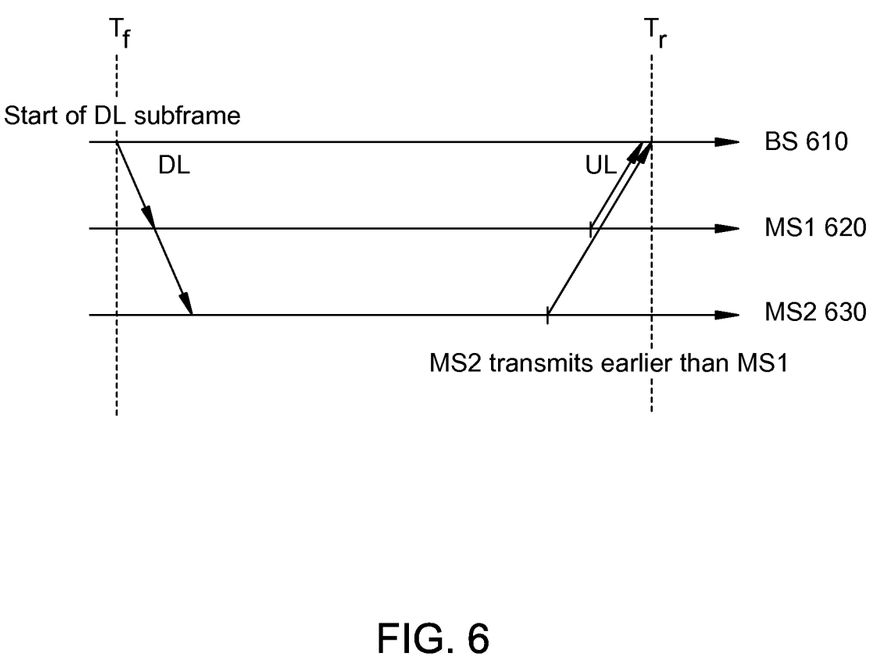
FIG. 6 illustrates example system timing in a WiMAX communication system for an exemplary case of two mobile stations with different ranges to a target base station in accordance with certain embodiments of the present disclosure.

FIG. 6 illustrates timing in the WiMAX communication system during uplink (UL) and downlink (DL) transmissions for the exemplary case of two mobile stations with different ranges to a target base station 610. In an ideal case, the UL sub-frames arrive synchronously at the base station, as if all active mobile stations are co-located close to the target BS. However, mobile stations located further from the target BS (such as MS2 630 in FIG. 6) may need to transmit UL sub-frame earlier than an MS closer to the target BS (such as MS1 620 in FIG. 6).

The amount of timing and frequency adjustments for particular MS may be determined by the target BS as a part of the handover ranging process. Information about time and frequency adjustments may be transmitted to a specific MS as an integral part of the ranging response (RNG-RSP) message. However, for successful decoding of the ranging request (RNG-REQ) message transmitted from the MS prior to the RNG-RSP message, an arrival of the RNG-REQ message at the target BS may need to be aligned with UL sub-frame boundary within a given tolerance. Therefore, the starting time of the RNG-REQ message may need to be adjusted before reception of the RNG-RSP message.

Figure 7:
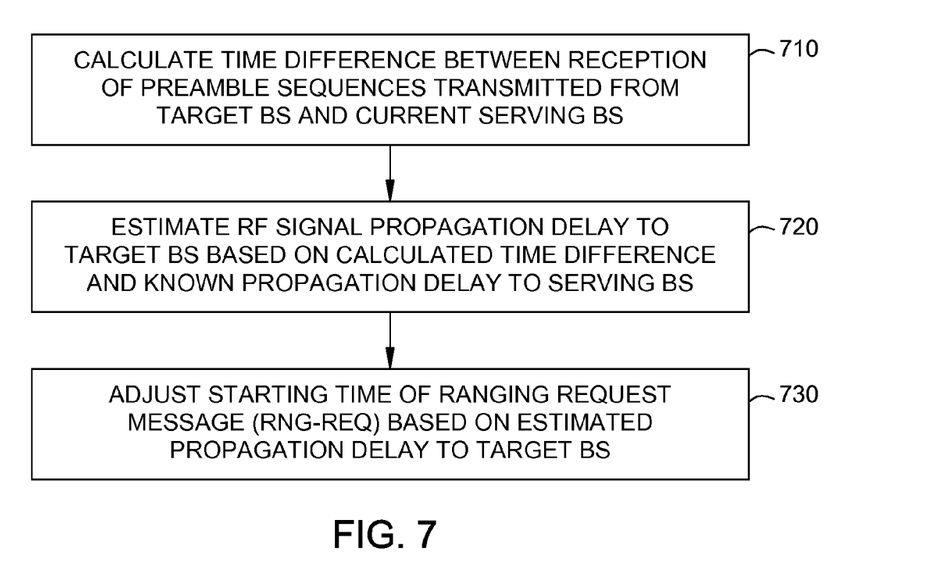
FIG. 7 illustrates example operations for adjusting the starting time of the ranging request message in accordance with certain embodiments of the present disclosure.
Figure 8:
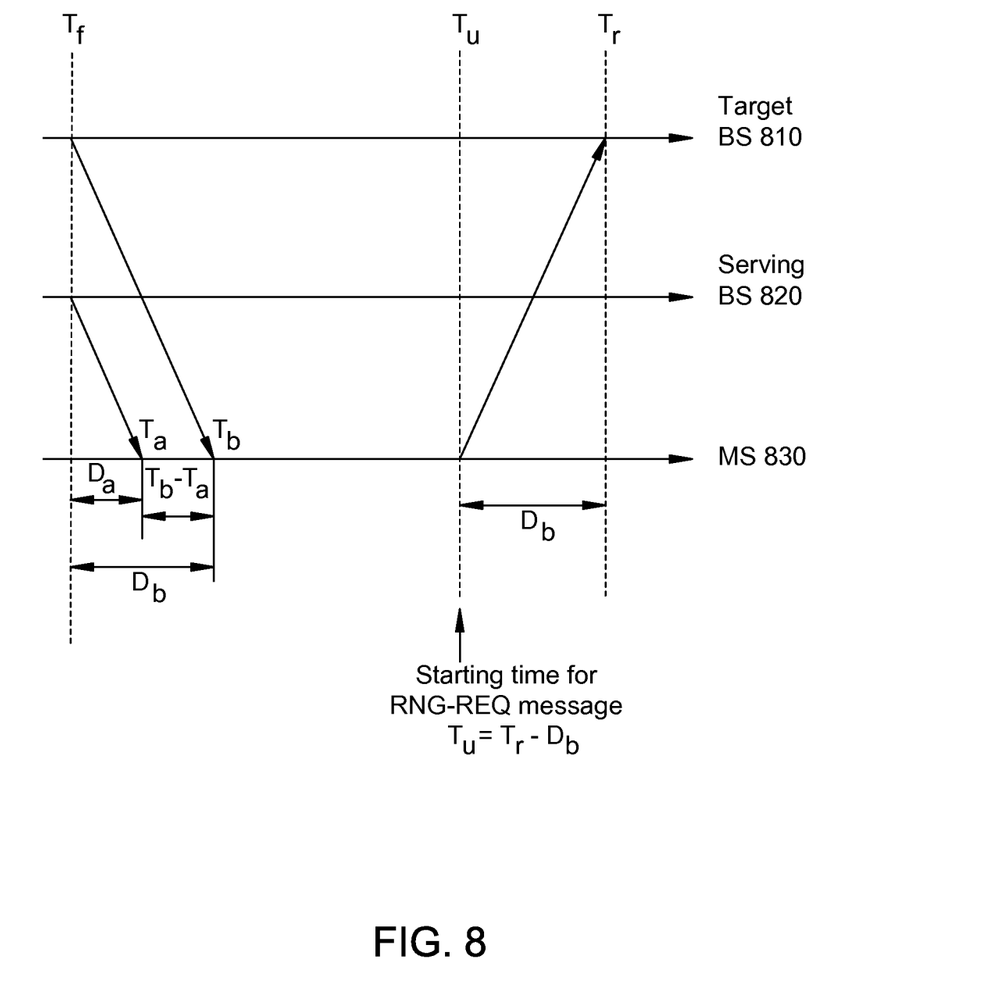
FIG. 8 illustrates example system timing in a WiMAX communication system during the handover procedure from a serving base station to a target base station in accordance with certain embodiments of the present disclosure.

FIG. 7 shows example operations that may be performed at a mobile station for adjusting the starting time of the ranging request message during the handover procedure, in accordance with certain embodiments of the present disclosure. FIG. 8 illustrates timing in the WiMAX communication system during the handover from a serving base station to a target base station, which will help illustrate the example operations of FIG. 7.

The operations may begin by calculating a relative difference in propagation delay between the MS and the current serving BS and the MS and the target BS, for example, by calculating a time difference between reception of preamble sequences transmitted from a target BS and a current serving BS, at 710. Rather than calculate the difference between the start of preamble sequences, the MS may utilize the difference between any two points in a data structure transmitted at known relative times from the current serving and target BS.

At 720, an RF signal propagation delay is estimated based on the calculated time difference and a known propagation delay to serving BS. At 730, the starting time of a ranging request message (RNG-REQ) is adjusted based on the estimated propagation delay to the target BS.

Before starting the handover, an MS 830 may already know the RF signal propagation delay Da to a current serving BS 820 by performing initial and periodic ranging process described in FIG. 5. The serving BS and a target BS 810 are typically required to be time-synchronized to each other in order to start a frame transmission at substantially the same time Tf, as illustrated in FIG. 8. The MS may receive the preamble (delimiter of a frame) from the current serving BS 820 at time Ta, and may receive the preamble (delimiter of a frame) from the target BS 810 at time Tb.

Thus, the MS may estimate the RF signal propagation delay to the target BS, Db, as follows:

$$D_a = T_a - T_f \quad (1)$$

$$D_b = T_b - T_f = (T_b - T_a) + D_a. \quad (2)$$

Equation (2) shows that the MS does not need to know absolute frame boundary Tf in order to estimate the RF signal propagation delay to the target BS. Instead, the MS may calculate a time-difference between receptions of preamble sequences transmitted from the target BS and the currently serving BS, namely $(T_b - T_a)$. The RF signal propagation delay to the target BS may be then estimated by using calculated time-difference between receptions of preamble sequences transmitted from the target BS and the currently serving BS, and by using previously known propagation delay to the serving BS, Da.

The MS may calculate from equation (1) the absolute DL sub-frame start time at the target BS 810, namely Tf illustrated in FIG. 8, as:

$$T_f = T_a - D_a \quad (3)$$

By knowing the DL sub-frame boundary start time, the DL sub-frame duration and the downlink-to-uplink guard time, an MS may compute the absolute UL starting time, namely Tr illustrated in FIG. 8 as:

$$T_r = T_f + \text{DLSubframeDuration} + \text{DLToULGuardTime} \quad (4)$$

The MS may adjust the starting time to begin transmitting the UL sub-frame, Tu, by deducting the propagation delay of the target BS for sending the ranging request (RNG-REQ) message:

$$T_u = T_r - D_b \quad (5)$$

Along with adjusting the starting time of the RNG-REQ message, a carrier frequency of an MS may also need to be adjusted with a carrier frequency of a target BS during the initial ranging process. In the case of time division duplex (TDD) system that may be considered in the present disclosure, uplink and downlink transmissions may share the same carrier frequency. Therefore, as a part of the carrier frequency adjustment during initial ranging process, the MS may calculate carrier frequency offset for the uplink transmission by utilizing the downlink carrier frequency offset measurements.

Beside time and frequency adjustments that may be achieved by utilizing initial ranging parameters, an MS may also support open-loop power control. The MS may calculate maximum allowable transmission signal strength for the initial ranging (IR), PTR_IR_MAX as follows:

$$P_{TR\_IR\_MAX} = \text{EIRxP}_{IR\_MAX} + \text{BS\_EIRP} - \text{RSS} \quad (6)$$

where the maximum equivalent isotropic received power (EIRxPIR_MAX) and Base Station Effective Isotropic Radiated Power (BS_EIRP) may be obtained from the Downlink Channel Descriptor (DCD) message. The Received Signal Strength (RSS) represents measured Received Signal Strength Indication (RSSI) at the side of MS. The MS may utilize information about maximum allowable transmission signal strength in order to adjust the transmission power for initial ranging, and, therefore, to facilitate more reliable delivery of the ranging request (RNG-REQ) message to a target BS during the handover process.

Figure 7A:
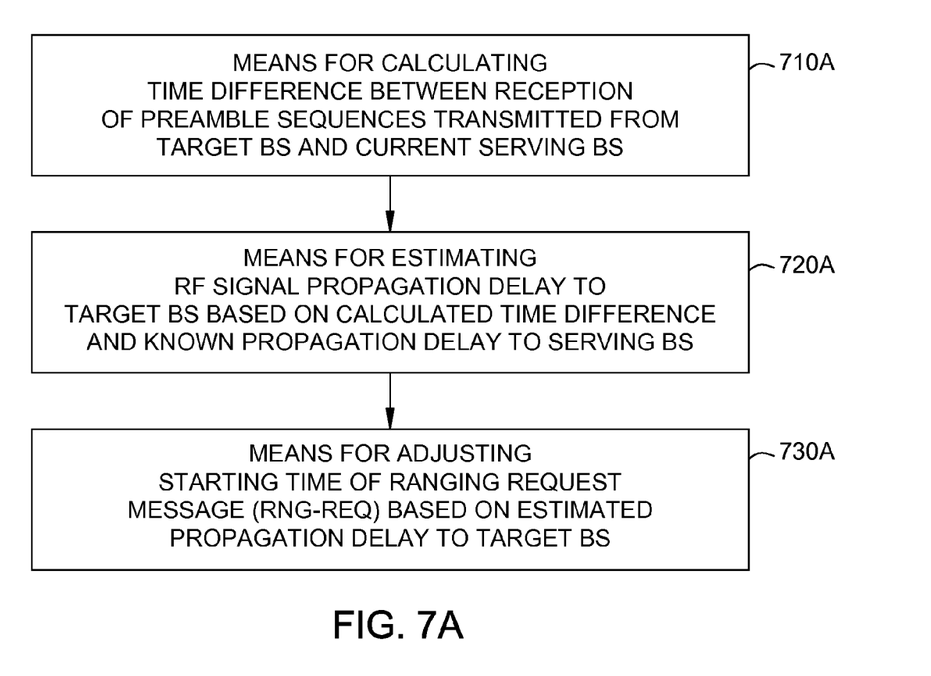
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 710-730 illustrated in FIG. 7 correspond to means-plus-function blocks 710A-730A illustrated in FIG. 7A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for synchronizing with a target base station (BS), comprising:
    calculating a relative time difference in radio frequency (RF) signal propagation delays associated with a serving BS and the target BS;
    estimating the RF signal propagation delay associated with the target BS based on the calculated relative time difference and a known RF propagation delay associated with the serving BS;
    calculating an uplink starting time for the target BS based on a start time of a frame transmission from the target BS, a downlink sub-frame duration, and a downlink to uplink guard time; and
    adjusting a starting time of a ranging request (RNG-REQ) transmitted to the target BS, based on the estimated RF signal propagation delay associated with the target BS, wherein the adjustment to the starting time of the RNG-REQ is determined at least in part by deducting the estimated RF signal propagation delay from the calculated uplink starting time for the target BS.

2. The method of claim 1, wherein calculating the relative time difference in RF signal propagation delays associated with the serving BS and the target BS comprises:
    calculating a time difference between reception of preamble sequences transmitted from the target BS and the serving BS.

3. The method of claim 1, further comprising obtaining the known RF propagation delay associated with the serving BS by at least one of:
    initial ranging operations with the serving BS; and
    periodic ranging operations with the serving BS.

4. The method of claim 1, wherein the serving BS and the target BS are time-synchronized, such that each starts frame transmissions at substantially the same time as the other.

5. The method of claim 1, further comprising:
   determining an adjustment to a transmission power of the uplink signal based on a received signal strength of a transmission from the target BS, a maximum equivalent isotropic radiated power value, and a base station effective isotropic radiated power value.

6. The method of claim 1, wherein the starting time of the RNG-REQ is adjusted so that arrival of the RNG-REQ at the target BS is aligned to a scheduled orthogonal frequency division multiplexing (OFDM) symbol boundary of the uplink starting time within a specified tolerance.

7. The method of claim 1, wherein the method is performed by a mobile station.

8. An apparatus for synchronizing with a target base station (BS), comprising:
   a processor;
   memory coupled to the processor;
   instructions stored in the memory, the instructions being executable by the processor to calculate a relative time difference in radio frequency (RF) signal propagation delays associated with a serving BS and the target BS;
   estimate the RF signal propagation delay associated with the target BS based on the calculated relative time difference and a known RF propagation delay associated with the serving BS;
   calculate an uplink starting time for the target BS based on a start time of a frame transmission from the target BS, a downlink sub-frame duration, and a downlink to uplink guard time; and
   adjusting a starting time of a ranging request (RNG-REQ) transmitted to the target BS, based on the estimated RF signal propagation delay associated with the target BS, wherein the adjustment to the starting time of the RNG-REQ is determined at least in part by deducting the estimated RF signal propagation delay from the calculated uplink starting time for the target BS.

9. The apparatus of claim 8, wherein the instructions are executable by the processor to:
   calculate a time difference between reception of preamble sequences transmitted from the target BS and the serving BS.

10. The apparatus of claim 8, wherein the instructions are executable by the processor to obtain the known RF propagation delay associated with the serving BS by at least one of:
    initial ranging operations with the serving BS; and
    periodic ranging operations with the serving BS.

11. The apparatus of claim 8, wherein the serving BS and the target BS are time-synchronized, such that each starts frame transmissions at substantially the same time as the other.

12. The apparatus of claim 8, wherein the instructions are executable by the processor to:
    determine an adjustment to a transmission power of the uplink signal based on a received signal strength of a transmission from the target BS, a maximum equivalent isotropic radiated power value, and a base station effective isotropic radiated power value.

13. The apparatus of claim 8, wherein the starting time of the RNG-REQ is adjusted so that arrival of the uplink signal at the target BS is aligned to a scheduled orthogonal frequency division multiplexing (OFDM) symbol boundary of the uplink starting time within a specified tolerance.

14. The apparatus of claim 8, wherein the apparatus is part of a mobile station.

15. An apparatus for synchronizing with a target base station (BS), comprising:
    means for calculating a relative time difference in radio frequency (RF) signal propagation delays associated with a serving BS and the target BS;
    means for estimating the RF signal propagation delay associated with the target BS based on the calculated relative time difference and a known RF propagation delay associated with the serving BS;
    means for calculating an uplink starting time for the target BS based on a start time of a frame transmission from the target BS, a downlink sub-frame duration, and a downlink to uplink guard time; and
    means for adjusting a starting time of a ranging request (RNG-REQ) transmitted to the target BS, based on the estimated RF signal propagation delay associated with the target BS, wherein the adjustment to the starting time of the RNG-REQ is determined at least in part by deducting the estimated RF signal propagation delay from the calculated uplink starting time for the target BS.

16. The apparatus of claim 15, wherein the means for calculating the relative time difference in RF signal propagation delays associated with the serving BS and the target BS comprises:
    means for calculating a time difference between reception of preamble sequences transmitted from the target BS and the serving BS.

17. The apparatus of claim 15, further comprising means for obtaining the known RF propagation delay associated with the serving BS by at least one of:
    initial ranging operations with the serving BS; and
    periodic ranging operations with the serving BS.

18. The apparatus of claim 15, wherein the serving BS and the target BS are time-synchronized, such that each starts frame transmissions at substantially the same time as the other.

19. The apparatus of claim 15, further comprising:
    means for determining an adjustment to a transmission power of the uplink signal based on a received signal strength of a transmission from the target BS, a maximum equivalent isotropic radiated power value, and a base station effective isotropic radiated power value.

20. The apparatus of claim 15, wherein the starting time of the RNG-REQ is adjusted so that arrival of the uplink signal at the target BS is aligned to a scheduled orthogonal frequency division multiplexing (OFDM) symbol boundary of the uplink starting time within a specified tolerance.

21. The apparatus of claim 15, wherein the apparatus is part of a mobile station.

22. A computer-program product for synchronizing with a target base station (BS), comprising a non-transitory computer readable medium having instructions stored thereon, the instructions being executable by one or more processors and the instructions comprising:
    instructions for calculating a relative time difference in radio frequency (RF) signal propagation delays associated with a serving BS and the target BS;
    instructions for estimating the RF signal propagation delay associated with the target BS based on the calculated relative time difference and a known RF propagation delay associated with the serving BS;
    instructions for calculating the uplink starting time for the target BS based on a start time of a frame transmission from the target BS, a downlink sub-frame duration, and a downlink to uplink guard time; and instructions for adjusting a starting time of a ranging request (RNG-REQ) transmitted to the target BS, based on the estimated RF signal propagation delay associated with the target BS, wherein the adjustment to the starting time of the RNG-REQ is determined at least in part by deducting the estimated RF signal propagation delay from the calculated uplink starting time for the target BS.

23. The computer-program product of claim 22, wherein the instructions for calculating the relative time difference in RF signal propagation delays associated with the serving BS and the target BS comprises:
  instructions for calculating a time difference between reception of preamble sequences transmitted from the target BS and the serving BS.

24. The computer-program product of claim 22, wherein the instructions further comprise instructions for obtaining the known RF propagation delay associated with the serving BS by at least one of:
  initial ranging operations with the serving BS; and
  periodic ranging operations with the serving BS.

25. The computer-program product of claim 22, wherein the serving BS and the target BS are time-synchronized, such that each starts frame transmissions at substantially the same time as the other.

26. The computer-program product of claim 22, wherein the instructions further comprise:
  instructions for determining an adjustment to a transmission power of the uplink signal based on a received signal strength of a transmission from the target BS, a maximum equivalent isotropic radiated power value, and a base station effective isotropic radiated power value.

27. The computer-program product of claim 22, wherein the starting time of the RNG-REQ is adjusted so that arrival of the uplink signal at the target BS is aligned to a scheduled orthogonal frequency division multiplexing (OFDM) symbol boundary of the uplink starting time within a specified tolerance.

28. The computer-program product of claim 22, wherein the computer-program product is part of a mobile station.

* * * * *